United States Patent [19]

Sillers, III

[11] 4,296,710
[45] Oct. 27, 1981

[54] AUTOMATIC FEEDING APPARATUS

[76] Inventor: William M. Sillers, III, P.O. Box 227, Grant, Fla. 32949

[21] Appl. No.: 138,355

[22] Filed: Apr. 8, 1980

[51] Int. Cl.³ .............................................. A01K 61/02
[52] U.S. Cl. ................................................ 119/51.11
[58] Field of Search ............... 119/51.11, 56 R, 51 R; 222/70, 368, 305, 306, 307, 308; 307/141.4

[56] References Cited

U.S. PATENT DOCUMENTS

| 3,132,266 | 5/1964 | Richardson et al. | 307/141.4 |
| 3,435,804 | 4/1969 | Orlowski | 119/51.11 |
| 4,055,146 | 10/1977 | Smrt | 119/51.11 |

Primary Examiner—Hugh R. Chamblee

[57] ABSTRACT

An automatic feeding apparatus including a body member for being coupled to an aquarium, a hopper for receiving a canister of fish food, a valve device movably coupled within the body for periodically receiving the fish food in a first position and for discharging in a second position the fish food into the aquarium. An actuating device is provided for continuously rotating the valve between the first and second position. A clutch is interposed between the actuator and the valve for allowing the operational position of the valve to be continuously adjusted between the first and second positions, whereby the exact discharge time of the food into the aquarium may be adjusted. A plurality of time striations are included on the body member and a time indicator is coupled to and rotates with the valve so as to indicate the relative time interval before the discharging of the fish food.

11 Claims, 8 Drawing Figures

AUTOMATIC FEEDING APPARATUS

BACKGROUND OF THE INVENTION

1. Field of the Invention

The present invention relates to a feeding apparatus, and more particularly, to a feeding apparatus of the type which is coupled to an aquarium for periodically feeding a predetermined amount of food to the fish therein.

2. Description of the Prior Art

Many people find substantial rewards in raising and caring for various types of small animals. While the present invention relates primarily to a fish feeding device, the apparatus will be adaptable for feeding various other types of animals.

An aquarium may be viewed as a predominantly self-contained eco-system in that the waste and by-products of one population of the aquarium are utilized by another population of the aquarium as life sustaining elements. However, the recent popularity of exotic fresh and salt water aquariums having unusual and rare fish populations requires careful eco-system balancing. It is highly desirable to periodically provide a healthy and nutritious food for the fish, and it is also highly desirable to meter the distribution of the food so that the ecological balance of the aquarium will not be disturbed. That is, too much food added to the aquarium will accumulate and cause an unhealthy environment for the fish. On the other hand, too little food will have a detrimental effect on the health and growth of the fish.

It is also helpful to feed the fish on a routine that does not vary from day to day. Experience indicates that the fish are more docile in their behavior if adequate amounts of food are periodically disbursed. Typically the fish in an aquarium are fed once each 12-hour period. Some owners prefer to feed their fish only once every 24 hours, but this tends to cause overfeeding and a partial accumulation of food about the aquarium until the fish have fully consumed the deposited food. Manual feeding of the fish food is preferred by some owners, but consistent manual feeding is not always possible in view of work routines and schedule requirements which force aquarium owners to leave town for several days or even weeks at a time.

The careful balance maintained in the eco-system of the aquarium will allow the fish and other populations of the aquarium to exist for extended periods of time if the fish are fed predetermined amounts of food at regular intervals. The present invention is related directly toward the dispensing of a predetermined amount of food on a periodic basis over a long term so that the owner of the aquarium will be free from these daily responsibilities. Various other inventors have sought to design similar automatic feeding devices for other animals or aquariums, but each of these inventions falls short of the economy, flexibility and accuracy of the automatic feeding device described herein.

One complex automatic fish feeder is disclosed by Suchowski in U.S. Pat. No. 4,089,299, which has been assigned to the Hartz Mountain Corporation of Harrison, N.J. This automatic fish feeder is air-operated. A cup travels through a hopper containing the fish food in order to scoop a predetermined amount of the food and to deposit it into the aquarium via a suitable chute. The high cost of manufacturing the Suchowski device and its inherent complexity substantially detract from its desirability as an inexpensive and reliable automatic feeding device.

Marx, in U.S. Pat. No. 3,091,371, discloses an automatic fish feeding device which utilizes a synchronous electric motor to rotate a drum which dispenses a predetermined quantity of fish food over a given period of time. The drum disclosed by Marx must be filled by opening a small door in the container and filling the container with a funnel from a larger quantity of food. Marx also uses a scoop having a variable size inlet which is moved through the loosely stored food. This type of loading action for the food depositing subsystem is likely to foul when moisture causes the stored fish food to clump. Large clumps of the food may then harden and will not allow sufficient smaller quantities of food to pass through the open mouth. The existence of these problems are characterized by the existence of a movable hammer which is required to strike the dispensing vessel to dislodge the food stored therein. In contrast to the form of the invention disclosed by Marx, it is more desirable to vary the size of the dispensing container in order to control the amount of the food deposited in the aquarium rather than varying the size of the mouth of the container.

Malek, in U.S. Pat. No. 3,022,767, discloses a fish feeder which utilizes a synchronous motor and a cam in order to rotate typical fish food containers. The adjustable aperature in the mouth of the container is utilized to control the amount of the fish food which is dispensed. The synchronous motor and cam merely shake the container in a manner similar to the motion of the hand. Experience indicates that the aperatures in the fish food container will easily clog because of the moisture which is continuously present immediately above the surface of the aquarium. Thus, the Malek device does not provide for an accurate and reliable means for regulating the quantity of fish food actually dispensed.

Hoday, in U.S. Pat. No. 3,738,328, discloses an automatic fish feeding device which utilizes a synchronous motor to move several hoppers having food therein. Various aperatures are provided in the moving elements such that the food is dispensed when the aperatures are in the proper alignment. Various other fish feeders having similarly designed linearly actuated fish food dispensers are disclosed by Appleton in U.S. Pat. No. 3,050,029, Krag in U.S. Pat. No. 3,031,109, Klein in U.S. Pat. No. 3,177,850 and Loudon in U.S. Pat. No. 3,029,790.

Kaunzner, in U.S. Pat. No. 3,140,693 discloses an automatic fish feeding device which employs a synchronous motor for rotating a container having a plurality of compartments therein. As the container is rotated the food moves from a main storage compartment, through a connecting tunnel, and into a dispensing compartment which is adjustable in size. The compartments are arranged so that the dispensing compartment is loaded on one portion of the movement cycle of the container and is unloaded on the opposite motion of the container. While this design provides for a periodic dispensing of a predetermined amount of food, the device is complex to produce, difficult to load and is subject to fouling with clumps of fish food as previously discussed with regard to other similar inventions. Also, it is difficult for the operator to accurately control the time at which the food is dispensed if it becomes necessary to adjust the feeding schedule.

Smrt, in U.S. Pat. No. 4,055,146, discloses an automatic feeding apparatus which stores the fish food in a hopper. A rotary valve is used as a gate for dispensing food from the hopper. The rotary valve is controlled by a ratchet wheel which is intermittently driven by a reciprocable actuator which is alternately engaged and then disengaged by a thermostatic metallic strip. During each heating and cooling cycle of the strip, the ratchet wheel advances allowing the dispensing container to also advance. FIGS. 4, 5, 6 and 7 of this disclosure illustrate a generally disc-shaped dispenser which employs a container which is intermittently, but not continuously rotated to various positions in communication with the food storage hopper (two neutral positions, and one food dispensing position). While this disc-shaped dispenser reduces the possibility of the device jamming or dispensing the food unevenly, the size of the dispenser is not adjustable and it is difficult to adjust the time at which the food is dispensed. The use of a heated metallic strip also raises questions as to the safety of the device under certain failure modes. The construction of the device is not well-suited to economical production and reliable operating over long-term usage.

BRIEF DESCRIPTIONS OF THE DRAWINGS

Other objects, features and advantages of the present invention will be apparent from a study of the written description and drawings in which.

Figure 1:
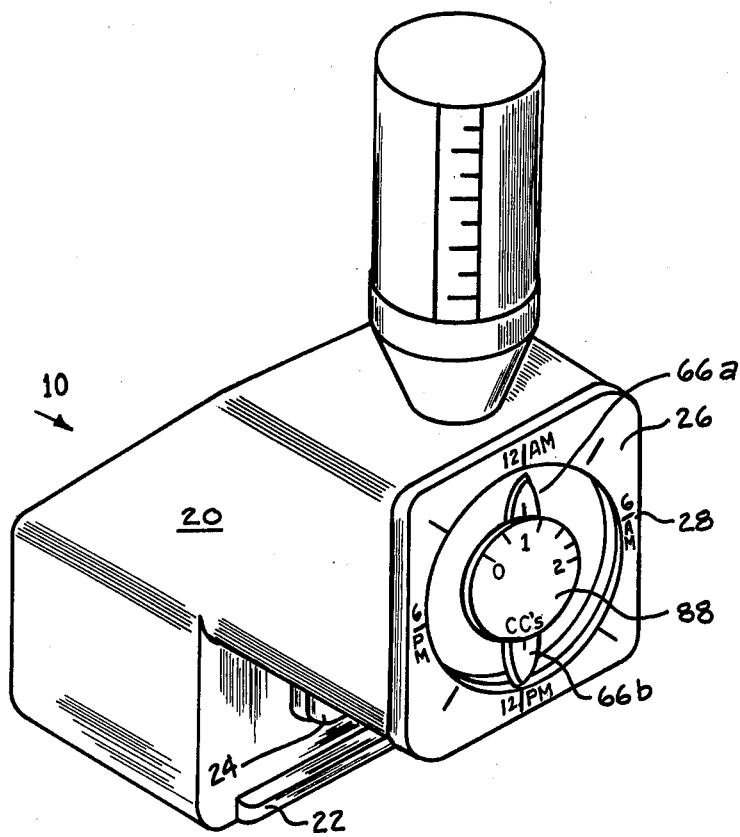
FIG. 1 is a side perspective view of the first preferred embodiment of the automatic feeding apparatus in accordance with the present invention.

In the drawings, like reference characters refer to like parts throughout the single views of the present invention. However, variations and modifications may be effected without departing from the spirit and scope of the concept of the disclosure as defined in the appended Claims. It should also be observed that the elements and operation of the embodiment of the present invention have been illustrated in somewhat simplified form in each of the drawings and in the following specification in order to eliminate unnecessary and complicating details which would be apparent to one skilled in this art. Therefore, other specific forms and constructions of the invention will be equivalent to the embodiments described although departing somewhat from the exact appearance of the drawings.

SUMMARY OF THE INVENTION

The present invention relates to an automatic feeding apparatus for periodically dispensing fish food into an aquarium. The apparatus includes a body member for being removably coupled to the aquarium. The body member includes a hopper for receiving a storage canister of fish food therein. A valve is carried by the body for periodically receiving in a first position the fish food from the hopper and for discharging the fish food into the aquarium in a second position. An actuator is provided for continuously rotating the valve between the first and second positions. A clutch is interposed between the actuator and the valve for allowing the valve to be continuously adjustable between the first and second positions in accordance with the time of day.

DESCRIPTION OF THE PREFERRED EMBODIMENT

Figure 2:
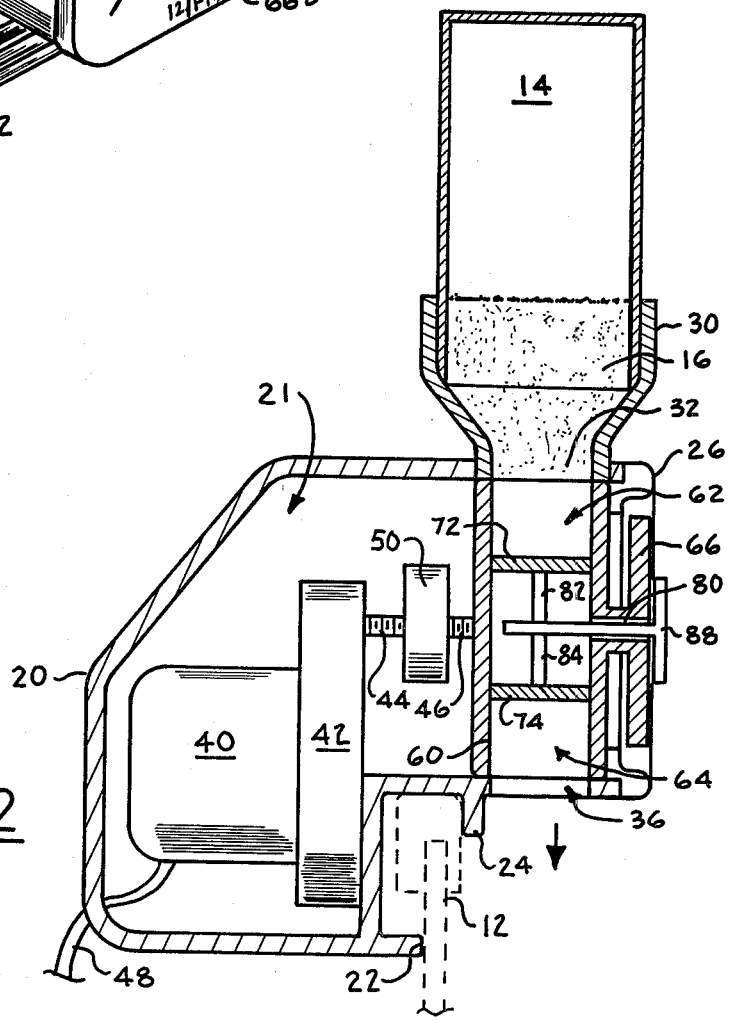
FIG. 2 is a partially bisected view taken along section lines 2—2 of the first preferred embodiment illustrated in FIG. 1.

The first preferred embodiment of the automatic feeding apparatus in accordance with the present invention is illustrated generally in FIGS. 1 and 2. While the first preferred embodiment of the present invention is illustrated for use with feeding fish, it will be apparent that the same construction and functional interactions of the elements may be utilized for an apparatus used to feed other animals.

The automatic feeding apparatus, shown generally as 10 in FIG. 1, includes a body section 20. As with most of the other parts of the present invention the body section 20 may be formed from a plastic or laminate material of the type which is both light in weight and inexpensive to mold or to manufacture. The body section 20 defines a cavity 21 therein for containing other operative elements of the present invention. The body section 20 also includes an outside support 22 which normally couples with the outside surface of an edge of the aquarium 12. An inside support 24 is also included for communicating with an inside surface of the top edge of the aquarium 12. These two supports 22 and 24 will allow the automatic feeding apparatus 10 to quickly and removably couple to the top section of an aquarium without the fear of the apparatus falling into the water within the aquarium. The body section 20 also includes a face section 26 on the front thereof which includes a plurality of time striations 28 which typically represent the face of a 24-hour clock.

A food funnel 30 is coupled to an upper section of the body 20. The diameter of the upper opening of the food funnel 30 is sized to create a resistance fit with the outside circumference of a typical fish food cylindrical container 14. When the slide aperature in the top of the normal fish food container is opened, the fish food container 14 will be supported within the food funnel 30 so that the fish food is withdrawn by gravity from within the container 14 and into the area defined within the funnel 30. Gravity will further pull the fish food, shown generally as 16, down toward the upper surface of the body section 20 and through a loading aperature 32 therein. A discharge aperature 36 is located in the lower section of the body 20 generally in vertical alignment with the loading aperature 32 in order to receive the fish food 16 which communicates therethrough.

A synchronous A.C. electrical motor 40 or other equivalent device is attached to and operatively coupled with a gear box 42. The mechanical output of the gear box 42 is coupled through a driving shaft 44 which in turn is coupled to a clutch mechanism shown generally as 50. The output of the clutch 50 is coupled to a driven shaft 46 which in turn is threaded into one planar side of a drum dispenser, shown generally as 60 in FIGS. 2 and 3.

Figure 3:
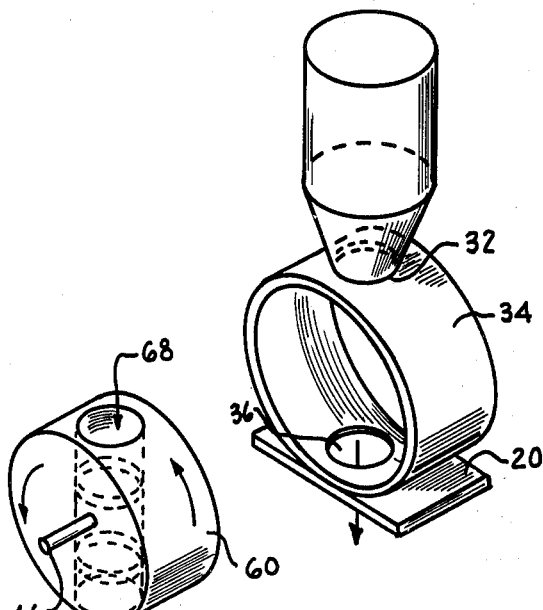
FIG. 3 is an exploded diagramatic illustration of the drum dispenser and body sections of the automatic feeding apparatus.

The drum dispenser 60 has a generally thin and cylindrical shape and is sized so as to fit within a circumferential body section illustrated generally as 34 in FIG. 3. It will be apparent from a study of FIGS. 2 and 3 that the circumferential body section 34 may be either a separate element of the body 20 or it may be molded as an integral part thereof. However, it is important to note that the outside diameter of the drum dispenser 60 is in close and reduced frictional communication with the inside surface of the circumferential body section 34. For purposes of clarity FIG. 3 illustrates the circumferential body section 34 as a separate element so that the loading aperature 32 and the discharge aperature 36 located therein will be apparent.

When A.C. voltage is applied to the synchronous motor 40 through the electrical conductors 48, the synchronous motor 40 will rotate the gears within the gear box 42, which in turn will rotate the driving shaft 44. The speed of the synchronous motor 40 and the gear reduction ratio of the gear box 42 are designed such that the driving shaft 44 will rotate exactly one complete revolution in each 24-hour period. The rotation of the driving shaft 44 will be coupled through the clutch 50 and then through the driven shaft 46 so that in a similar manner the drum dispenser 60 will also rotate exactly one complete revolution each 24-hour period. As illustrated in FIGS. 2 and 3, the drum dispenser 160 includes a generally cylindrical metering bore 68 therethrough which is generally perpendicular to the axis of the rotation of the drum dispenser 60 and the driven shaft 46. A first piston 72 and a second piston 74 movably communicate within this bore 68 so as to define a first cylindrical food receptacle 62 and a second food receptacle 64. As illustrated in FIG. 2, the cylindrical food receptacles 62 and 64 within the drum dispenser 60 are oriented such that the first cylindrical food receptacle 62 will open immediately adjacent to the loading aperature 32 at the same time the second cylindrical food receptacle 64 will open immediately adjacent to the discharge aperature 36. As the drum dispenser 60 is rotated continuously by the driven shaft 46, the openings defined by the cylindrical food receptacle 62 and 64 will be closed as they communicate adjacent to the solid circumferential body section 34 (more clearly shown in FIG. 3).

The size of the cylindrical food receptacles 62 and 64 are respectively determined by the linear location of the first piston 72 and the second piston 74 therein. The longitudinal movement of the first piston 72 is controlled by a first piston cam 82 which in turn is coupled to a capacity shaft 80 which exits through the front planar end of the drum dispenser 60, through the front face 26 of the body section 20 and terminates in a capacity display illustrated generally as 88. In a similar manner a second piston cam 84 determines the longitudinal extension of the second piston 74. The piston cams 82 and 84 are symmetrically coupled to the capacity shaft 80 so that the capacity of the first cylindrical food receptacle 62 and the second food receptacle 64 are generally equal. As the capacity display 88 is rotated, the capacity shaft 80 will cause the piston cams 82 and 84 to move the pistons 72 and 74 longitudinally within the bore 68 defined within the drum dispenser 60 so that the capacity of the cylindrical food receptacles 62 and 64 may be adjusted. In this manner the fish food 16 which is deposited by gravity from the food funnel 30 through the loading aperature 32 and into the first cylindrical food receptacle 62 may be adjusted to the appropriate requirements. Once the capacity of the first cylindrical food receptacle 62 is adjusted, the capacity of the second cylindrical food receptacle 62 should be generally equivalent thereto.

As the first cylindrical food receptacle 62 and the drum dispenser 60 are rotated in a generally clockwise direction, the cylindrical food receptacle 62 will travel within a 12-hour period to a point immediately adjacent to the discharge aperature 36. As the first cylindrical food receptacle 62 moves across the discharge aperature 36 the fish food 16 therein will be drawn by gravitational forces through the discharge aperature 36 and will then fall into the main body of the aquarium. At the same time the second cylindrical food receptacle 62 will progress into alignment with the loading aperature 32 and gravitational forces will load the fish food 16 thereinto.

The two feeding times determined by the first and second cylindrical food receptacles 62 and 64 are exactly 12 hours apart, typically with one in the morning and one in the evening. The exact feeding times may be adjusted by rotating a feeding time hand 66 which is coupled through the front face 26 of the body section 20 so as to be attached to the front planar surface of the drum dispenser 60. The feeding time hand assembly 66 includes an upper pointer 66a which is generally in radial alignment with the longitudinal axis of the first cylindrical food receptacle 62, and a lower hand assembly 66b which is in general radial alignment with the longitudinal axis of the second food receptacle 64. In this manner the feeding time hand assembly 66 will point to the appropriate time striations 28 on the outside front face 26 of the body section 20 so as to indicate the exact time of feeding. Since the drum dispenser 60 rotates one revolution each 24 hours, the food will be dispensed approximately every 12 hours. The clutch 50 allows the operator to grasp the feeding time hand assembly 66 and to rotate it independently of the position of the driving shaft 44 when a substantial torque differential occurs therebetween.

Figure 4:
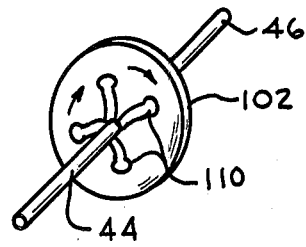
FIG. 4 is a frontal perspective view of an alternate embodiment for the clutch illustrated in FIG. 2.

One embodiment of the clutch 50 is illustrated on FIG. 4 as including a plurality of leaf-springs 10 which are attached to the end of the driving shaft 44 so as to couple with a disc 102 coupled to the end of the driven shaft 46. The leaf-springs 100 would be tensioned so that the normal torque of the synchronous motor 40 would be passed without slippage between the driving shaft 44 and the driven shaft 46, while any large torque differential of the type produced by the operator rotating the feeding time hand assembly 66 would cause slippage between the leaf-springs 100 and the disc 102, thereby allowing for the adjustment of the feeding times.

Figure 6:
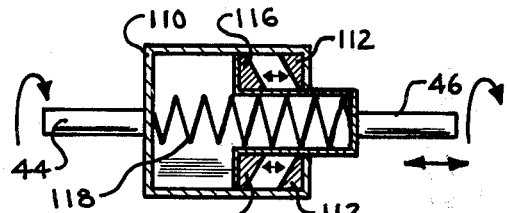
FIG. 6 illustrates a side sectional view of an alternate embodiment for the clutch illustrated in FIG. 2.

Another embodiment for the clutch 50 is illustrated in FIG. 6 as including a hollow cylindrical gear 110 having a plurality of gear teeth 112 arranged along the inside circumferential surface thereof. A smaller cylindrical gear 114 having a plurality of gear teeth 116 is coupled within the hollow cylindrical gear 110. The size of the teeth 112 and 116 are determined such that a slight depression of the feeding time hand assembly 66 toward the motor 40 would disengage the cylindrical gears 112 and 116 in order to allow a free readjustment of the relative angular positions of the shafts 44 and 46. The size and compression value of a spring 118 of the clutch illustrated in FIG. 6 may be determined such that any torque above a predetermined maximum level between the two coaxial shafts 44 and 46 will cause the gear teeth 112 and 116 to ride up on each other and to effectively disengage in order to allow for the resetting of the angular registration between the two shafts. This automatic decoupling of the shafts will not occur under normal low level torque conditions such as when the synchronous motor is merely rotating the drum dispenser 60.

Figure 5:
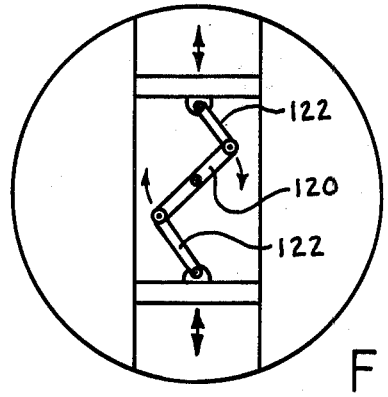
FIG. 5 illustrates a front sectional view of an alternate embodiment for the piston positioning device illustrated in FIG. 2.

With reference to FIGS. 2 and 5, while the elements 82 and 84 have been illustrated as cams for regulating the longitudinal position of the pistons 72 and 74 about the capacity shaft 80 within the longitudinal bore 68 of the drum dispenser 60, an alternate embodiment shown in FIG. 5 envisions the use of a butterfly louver 120 which actuates a pinion linkage 122 coupled between the capacity shaft 80 and the pistons 72 and 74. This pinion linkage 122 would operate in a manner similar to the crankshaft of an automobile for regulating the longitudinal extension of the pistons 72 and 74 within the bore internal to the drum dispenser 60. Of course, various other arrangements would also be suitable for this purpose, with the final choice being determined by economy of production, reliability and the accuracy of the volumes of the first and second cylindrical food receptacles 62 and 64 which are required.

Figure 7:
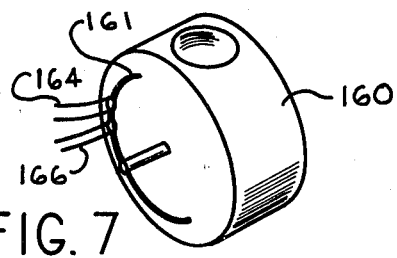
FIG. 7 illustrates a side perspective view of an alternate embodiment for the drum dispenser having the conductive strip and wipers couples thereto.
Figure 8:
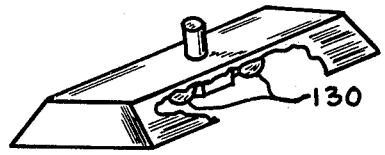
FIG. 8 illustrates an alternate embodiment of the present invention which controls the illumination of fluorescent lights above the aquarium.

With reference to FIGS. 7 and 8, it is also envisioned that the periodic timer employed in the present invention to rotate the drum dispenser 60 may also be used to control related accessories to an aquarium. For example, FIG. 7 illustrates a second preferred embodiment of the drum dispenser 160 as having a first conductive strip 161 located upon one of the planar surfaces thereof. A first wiper arm 164 and a second wiper arm 166 are stressed into movable communication along the first conductive strip 161. The first and second wiper arms 164 and 166 are generally coupled in series between a source of electrical energy and a plurality of fluorescent light bulbs 130 (shown in FIG. 8) so as to periodically energize and provide illumination from the bulbs. Since the first conductive strip 161 rotates with the second embodiment of the drum dispenser 160, the lights 130 will be generally illuminated for approximately 12 hours per day. Since the drum dispenser 160 can be independently rotated with respect to the driving shaft 44 by operation of the clutch 50, the time of day at which the fluorescent tubes 130 are illuminated can be varied in accordance with the predetermined feeding times.

With regard to FIG. 8, this second embodiment of the automatic feeding apparatus employing the lighting feature is illustrated as being coupled to a roof structure of the appropriate size and dimensions for being coupled over the aquarium 12. In this manner the fish food is dispensed from the automatic feeding apparatus 10 at a point generally in the middle of the aquarium. The location of the elongated fluorescent lighting tubes 130 may be arranged so as to provide generally constant illumination over the entire aquarium.

The operation of the preferred embodiment of the automatic feeding apparatus 10 will now be discussed with regard to FIGS. 1 and 2. The top aperature in a standard fish food container 14 is opened, and then the fish food container 14 is turned upside down and coupled into the food funnel 30. The fish food 16 will then be pulled by gravitational forces through the food funnel 30 and the loading aperature 32. The fish food 16 will then communicate with the outside circumferential surface of the drum dispenser 60 until such time as the first cylindrical food receptacle 62 rotates into the proper alignment with the loading aperature 32. At this time the fish food 16 will be deposited within the first cylindrical food receptacle 62 according to the height of the piston 72. This height may be adjusted by merely rotating the capacity display 88. The time of feeding is adjusted by rotating the feeding time hand assembly 66 so that the appropriate pointer thereon is adjacent to the desired dispensing time striation 28 on the front face 26 of the body section 20.

As the synchronous motor 40 causes the gears 42 to rotate, the rotation will be transferred through the clutch assembly 50 and the driven shaft 46 into the drum dispenser 60. After approximately 12 hours the first cylindrical food receptacle 62 will be in proper alignment with the discharge aperature 36, thereby allowing gravitational forces to pull the fish food 16 from the first cylindrical food receptacle 62 and into the general body of the aquarium 12. At the same time the second cylindrical food receptacle 64 should be in proper alignment with the loading aperature 30 so as to be fully loaded with fish food 16 from the food funnel 30.

It should be noted that in view of the substantial mass of the typical synchronous motor 40, the center of mass of the automatic feeding apparatus 10 will be toward the rear thereof. This mass will cause a counterclockwise rotation of the automatic feeding apparatus 10 as viewed in FIG. 2, thereby securely forcing the outside support 22 against a back or outside surface of the aquarium 12. This will provide additional stability and will typically prevent the automatic feeding apparatus 10 from being accidentally tipped into the water within the aquarium. The automatic feeding apparatus 10 may be easily decoupled from the aquarium for repairs or cleaning.

In accordance with the provisions of the United States Patent Laws, a particular preferred embodiment of the present invention has been described in detail. The principals of the invention of the invention have been described in the best mode in which it is now contemplated that such principals may be applied. However, it will be understood that the constructions shown and described in the attached specification and in the drawings are merely illustrative and that the invention is not limited thereto. Accordingly, alterations and modifications which readily suggest themselves to persons skilled in this art, without departing from the true spirit of the disclosure herein, are intended to be included in the scope of the following claims.

I claim:
1. An automatic feeding apparatus for periodically dispensing fish food into an aquarium, said apparatus comprising in combination:
   a body member for being removably coupled to the aquarium;
   a hopper carried by said body member for receiving a storage canister of fish food;
   valve means movably coupled to said body member for periodically receiving in a first position the fish food from said hopper and for discharging in a second position the fish food into the aquarium, said valve means including,
   a generally cylindrical drum dispenser which is rotatably carried within a circumferential section of said body member, with said drum dispenser including therein an open metering bore, and
   a first piston movable within said bore so as to adjust the capacity of a first food receptacle defined by said metering bore, said first piston and said circumferential section of said body member;

actuator means for rotating said valve means between said first and said second positions; and clutch means interposed between said actuator means and said valve means for allowing the operating position of said valve means to be continuously adjusted between said first and said second positions, whereby the exact discharge time of the fish food into the aquarium may be adjusted.

2. The automatic feeding apparatus as described in claim 1 wherein said body member includes a plurality of time striations arranged on a face thereof, and wherein said valve means includes a dispensing time indicator which rotates around said time striations so as to indicate the relative time interval before the discharging of the fish food.

3. The automatic feeding apparatus as described in claim 1 wherein said clutch means comprises in combination a first element coupled to said actuator means, a second element coupled to said valve means, and compression means for frictionally coupling low torque levels between said first and second elements but disengaging upon receiving torque levels above a maximum limit.

4. The automatic feeding apparatus as described in claim 3 wherein said first and second elements include meshing gear teeth thereon for transferring the maximum levels of torque therebetween.

5. The automatic feeding apparatus as described in claim 1 wherein said hopper opens through a loading aperature in said circumferential section of said body member to allow gravitational feed of the fish food into said first food receptacle when juxtaposed thereto, and further including a discharge aperature in a lower portion of said circumferential section of said body member for allowing gravitational discharge of the fish food from said food receptacle when juxtaposed thereto.

6. The automatic feeding apparatus as described in claim 5 wherein said actuator means comprises a synchronous motor, and wherein said body member includes a first surface for coupling with an inside surface of the aquarium and a second surface for coupling with an adjacent outside surface of said aquarium, with said synchronous motor being cantilevered outwardly beyond said second surface so as to cause a positive coupling of the aquarium side between said first and said second surfaces in order that the apparatus will fall outside the aquarium if dislodged.

7. The automatic feeding apparatus as described in claim 5 further including a conductive circumferential strip on a rotating surface of said drum dispenser and further including a plurality of wipers coupled between a source of electrical energy and means for illuminating the aquarium, with said wipers juxtaposed with said conductive strip so as to periodically couple electrical energy therethrough to said illuminating means responsive to the periodic rotation of said drum dispenser.

8. The automatic feeding apparatus as described in claim 5 wherein an inside circumferential surface of said hopper is sized so as to create a resistance fit with an outside circumferential surface of a standard fish food storage canister.

9. The automatic feeding apparatus as described in claim 5 further including a second piston movably coupled within said metering bore of said drum dispenser for adjusting the capacity of a second food receptacle defined by said metering bore, said second piston and said circumferential section of said body member.

10. The automatic feeding apparatus as described in claim 9 further including position means for regulating the longitudinal movement of said first and said second pistons within said metering bore of said drum dispenser.

11. The automatic feeding apparatus as described in claim 10 wherein said position means is controlled by the angular position of a shaft which communicates generally along the rotational axis of said drum dispenser and terminates in a capacity indicator movably coupled to said dispensing indicator.

* * * * *